US009099098B2

(12) United States Patent
Atti et al.

(10) Patent No.: US 9,099,098 B2
(45) Date of Patent: Aug. 4, 2015

(54) VOICE ACTIVITY DETECTION IN PRESENCE OF BACKGROUND NOISE

(71) Applicant: Qualcomm Incorporated, San Diego, CA (US)

(72) Inventors: Venkatraman Srinivasa Atti, San Diego, CA (US); Venkatesh Krishnan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 231 days.

(21) Appl. No.: 13/670,312

(22) Filed: Nov. 6, 2012

(65) Prior Publication Data

US 2013/0191117 A1 Jul. 25, 2013

Related U.S. Application Data

(60) Provisional application No. 61/588,729, filed on Jan. 20, 2012.

(51) Int. Cl.

*G10L 15/00* (2013.01)
*G10L 15/20* (2006.01)
*G10L 25/84* (2013.01)

(52) U.S. Cl.

CPC .................................... *G10L 25/84* (2013.01)

(58) Field of Classification Search

USPC ................................. 704/200–257, 500–504
See application file for complete search history.

(56) References Cited

U.S. PATENT DOCUMENTS

| | | | | |
|---|---|---|---|---|
| 4,945,566 A * | 7/1990 | Mergel et al. | 704/253 |
| 5,572,623 A * | 11/1996 | Pastor | 704/233 |
| 5,794,195 A * | 8/1998 | Hormann et al. | 704/253 |
| 2007/0265842 A1 | 11/2007 | Jarvinen et al. | |
| 2009/0240495 A1 * | 9/2009 | Ramakrishnan et al. | 704/226 |
| 2011/0035213 A1 | 2/2011 | Malenovsky et al. | |
| 2011/0071825 A1 * | 3/2011 | Emori et al. | 704/233 |

FOREIGN PATENT DOCUMENTS

WO WO-2007091956 A2 8/2007

OTHER PUBLICATIONS

International Search Report and Written Opinion—PCT/US2013/020636—ISA/EPO—Mar. 25, 2013.

* cited by examiner

*Primary Examiner* — Jesse Pullias
(74) *Attorney, Agent, or Firm* — Austin Rapp & Hardman

(57) ABSTRACT

In speech processing systems, compensation is made for sudden changes in the background noise in the average signal-to-noise ratio (SNR) calculation. SNR outlier filtering may be used, alone or in conjunction with weighting the average SNR. Adaptive weights may be applied on the SNRs per band before computing the average SNR. The weighting function can be a function of noise level, noise type, and/or instantaneous SNR value. Another weighting mechanism applies a null filtering or outlier filtering which sets the weight in a particular band to be zero. This particular band may be characterized as the one that exhibits an SNR that is several times higher than the SNRs in other bands.

48 Claims, 9 Drawing Sheets

VOICE ACTIVITY DETECTION IN PRESENCE OF BACKGROUND NOISE

CROSS-REFERENCE TO RELATED APPLICATIONS

This application claims priority under the benefit of 35 U.S.C. §119(e) to Provisional Patent Application No. 61/588,729, filed Jan. 20, 2012. This provisional patent application is hereby expressly incorporated by reference herein in its entirety.

BACKGROUND

For applications in which communication occurs in noisy environments, it may be desirable to separate a desired speech signal from background noise. Noise may be defined as the combination of all signals interfering with or otherwise degrading the desired signal. Background noise may include numerous noise signals generated within the acoustic environment, such as background conversations of other people, as well as reflections and reverberation generated from the desired signal and/or any of the other signals.

Signal activity detectors, such as voice activity detectors (VADs), can be used to minimize the amount of unnecessary processing in an electronic device. A voice activity detector may selectively control one or more signal processing stages following a microphone. For example, a recording device may implement a voice activity detector to minimize processing and recording of noise signals. The voice activity detector may de-energize or otherwise deactivate signal processing and recording during periods of no voice activity. Similarly, a communication device, such as a smart phone, mobile telephone, personal digital assistant (PDA), laptop, or any portable computing device, may implement a voice activity detector in order to reduce the processing power allocated to noise signals and to reduce the noise signals that are transmitted or otherwise communicated to a remote destination device. The voice activity detector may de-energize or deactivate voice processing and transmission during periods of no voice activity.

The ability of the voice activity detector to operate satisfactorily may be impeded by changing noise conditions and noise conditions having significant noise energy. The performance of a voice activity detector may be further complicated when voice activity detection is integrated in a mobile device, which is subject to a dynamic noise environment. A mobile device can operate under relatively noise free environments or can operate under substantial noise conditions, where the noise energy is on the order of the voice energy. The presence of a dynamic noise environment complicates the voice activity decision.

Conventionally, a voice activity detector classifies an input frame as background noise or active speech. The active/inactive classification allows speech coders to exploit pauses between the talk spurts that are often present in a typical telephone conversation. At a high signal-to-noise ratio (SNR), such as an SNR>30 dB, simple energy measures are adequate to accurately detect the voice inactive segments for encoding at minimal bit rates, thereby meeting lower bit rate requirements. However, at low SNRs, the performance of the voice activity detector degrades significantly. For example, at low SNRs, a conservative VAD may produce increased false speech detection, resulting in a higher average encoding rate. An aggressive VAD may miss detecting active speech segments, thereby resulting in loss of speech quality.

Most current VAD techniques use the long-term SNR to estimate a threshold (referred to as VAD_THR) to use in performing the VAD decision of whether the input frame is background noise or active speech. At low SNRs or under fast-varying non-stationary noise, the smoothed long-term SNR will produce an inaccurate VAD_THR, resulting in either increased probability of missed speech or increased probability of false speech detection. Also, some VAD techniques (e.g., Adaptive Multi-Rate Wideband or AMR-WB) work well for stationary type of noises such as car noise but produce a very high voice activity factor (due to extensive false detections) for non-stationary noise at low SNRs (e.g., SNR<15 dB).

Thus, the erroneous indication of voice activity can result in processing and transmission of noise signals. The processing and transmission of noise signals can create a poor user experience, particularly where periods of noise transmission are interspersed with periods of inactivity due to an indication of a lack of voice activity by the voice activity detector. Conversely, poor voice activity detection can result in the loss of substantial portions of voice signals. The loss of initial portions of voice activity can result in a user needing to regularly repeat portions of a conversation, which is an undesirable condition.

SUMMARY

The present invention is directed to compensating for the sudden changes in the background noise in the average SNR (i.e., $SNR_{avg}$) calculation. In an implementation, the SNR values in bands are selectively adjusted by outlier filtering and/or applying weights. SNR outlier filtering may be used, either alone or in conjunction with weighting the average SNR. An adaptive approach in subbands is also provided.

In an implementation, the VAD may be comprised within, or coupled to, a mobile device that also includes one or more microphones which captures sound. The device divides the incoming sound signal into blocks of time, or analysis frames or portions. The duration of each segment in time (or frame) is short enough that the spectral envelope of the signal remains relatively stationary.

In an implementation, the average SNR is weighted. Adaptive weights are applied on the SNRs per band before computing the average SNR. The weighting function can be a function of noise level, noise type, and/or instantaneous SNR value.

Another weighting mechanism applies a null filtering or outlier filtering which sets the weight in a particular band to be zero. This particular band may be characterized as the one that exhibits an SNR that is several times higher than the SNRs in other bands.

In an implementation, performing SNR outlier filtering comprises sorting the modified instantaneous SNR values in the bands in a monotonic order, determining which of the band(s) are the outlier band(s), and updating the adaptive weighting function by setting the weight associated with the outlier band(s) to zero.

In an implementation, an adaptive approach in subbands is used. Instead of logically combining the subband VAD decision, the differences between the threshold and the average SNR in subbands are adaptively weighted. The difference between a VAD threshold and the average SNR is determined in each subband. A weight is applied to each difference, and the weighted differences are added together. It may be determined whether or not there is voice activity by comparing the result with another threshold, such as zero.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

The following detailed description, which references to and incorporates the drawings, describes and illustrates one or more specific embodiments. These embodiments, offered not to limit but only to exemplify and teach, are shown and described in sufficient detail to enable those skilled in the art to practice what is claimed. Thus, for the sake of brevity, the description may omit certain information known to those of skill in the art.

In many speech processing systems, voice activity detection is typically estimated from an audio input signal such as a microphone signal, e.g., a microphone signal of a mobile phone. Voice activity detection is an important function in many speech processing devices, such as vocoders and speech recognition devices.

The voice activity detection analysis can be performed either in the time-domain or in the frequency-domain. In the presence of background noise and at low SNRs, the frequency-domain VAD is typically preferred to that of the time-domain VAD. The frequency-domain VAD has an advantage of analyzing the SNRs in each of the spectral bins. In a typical frequency domain VAD, first the speech signal is segmented into frames, e.g., 10 to 30 ms long. Next, the time-domain speech frame is transformed to a frequency domain using an N-point FFT (fast Fourier transform). The first half, i.e., N/2, frequency bins are divided into a number of bands, such as M bands. This grouping of spectral bins to bands typically mimics the critical band structure of the human auditory system. As an example, let N=256 point FFT and M=20 bands for a wideband speech that is sampled at 16,000 samples per second. The first band may contain N1 spectral bins, the second band may contain N2 spectral bins, and so on.

The average energy per band, $E_{cb}$ (m), in the m-th band is computed by adding the magnitude of the FFT bins within each band. Next, the SNR per band is calculated using equation (1):

$$SNR_{CB}(m) = \frac{E_{cb}(m)}{N_{cb}(m)},\ m = 1, 2, 3 \ldots\ M \text{ bands} \tag{1}$$

where $N_{cb}(m)$ is the background noise energy in the m-th band that is updated during inactive frames. Next, the average signal to noise ratio, $SNR_{avg}$, is calculated using equation (2):

$$SNR_{avg} = 10 \log 10(\Sigma_{m=1}^{M} SNR_{CB}(m)) \tag{2}$$

The $SNR_{avg}$ is compared against a threshold, VAD_THR, and a decision is made as shown in equation (3):

If $SNR_{avg}$>VAD_THR, then voice_activity=True;

else voice_activity=False. (3)

Figure 1:
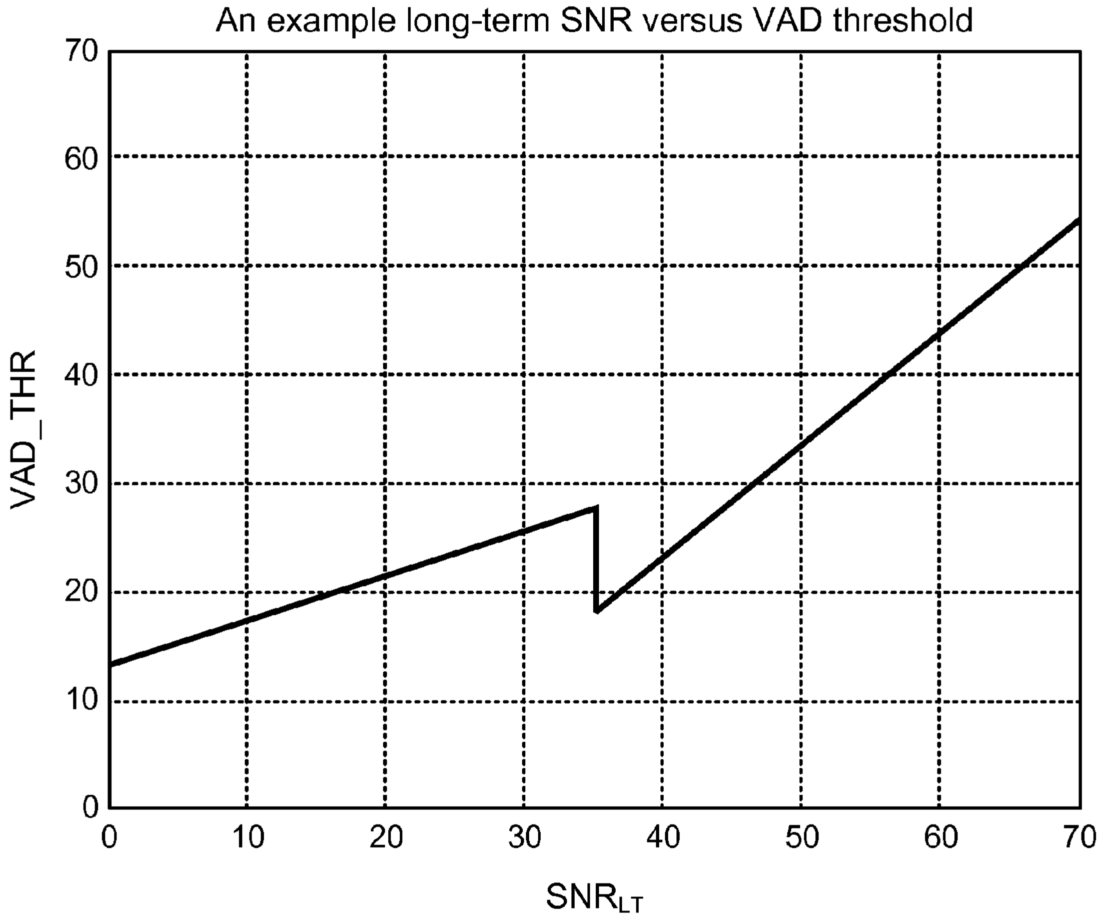
FIG. 1 is an example of a mapping curve of VAD threshold (VAD_THR) versus the long-term SNR (SNR_LT) that may be used in estimating a VAD threshold.

The VAD_THR is typically adaptive and is based on a ratio of long-term signal and noise energies, and the VAD_THR varies from frame to frame. One common way of estimating the VAD_THR is using a mapping curve of the form shown in FIG. 1. FIG. 1 is an example of a mapping curve of VAD threshold (i.e., VAD_THR) versus the SNR_LT (long-term SNR). The long-term signal energy and noise-energy are estimated using an exponential smoothing function. Then the long-term SNR, $SNR_{LT}$, is calculated using equation (4):

$$SNR_{LT} = 10 \log 10\left(\frac{\text{Smoothed signal energy}}{\text{Smoothed noise estimate energy}}\right) \tag{4}$$

As noted above, most current VAD techniques use the long-term SNR to estimate the VAD_THR to perform the VAD decision. At low SNRs or under fast-varying non-stationary noise, the smoothed long-term SNR will produce inaccurate VAD_THR, resulting in either increased probability of missed speech or increased probability of false speech detection. Also, some VAD techniques (e.g., Adaptive Multi-Rate Wideband or AMR-WB) work well for stationary type of noises such as car noise but produce very high voice activity factor (due to extensive false detections) for non-stationary noise at low SNRs (e.g., less than 15 dB).

Implementations herein are directed to compensating for the sudden changes in the background noise in the $SNR_{avg}$ calculation. As further described herein with respect to some implementations, the SNR values in bands are selectively adjusted by outlier filtering and/or applying weights.

Figure 2:
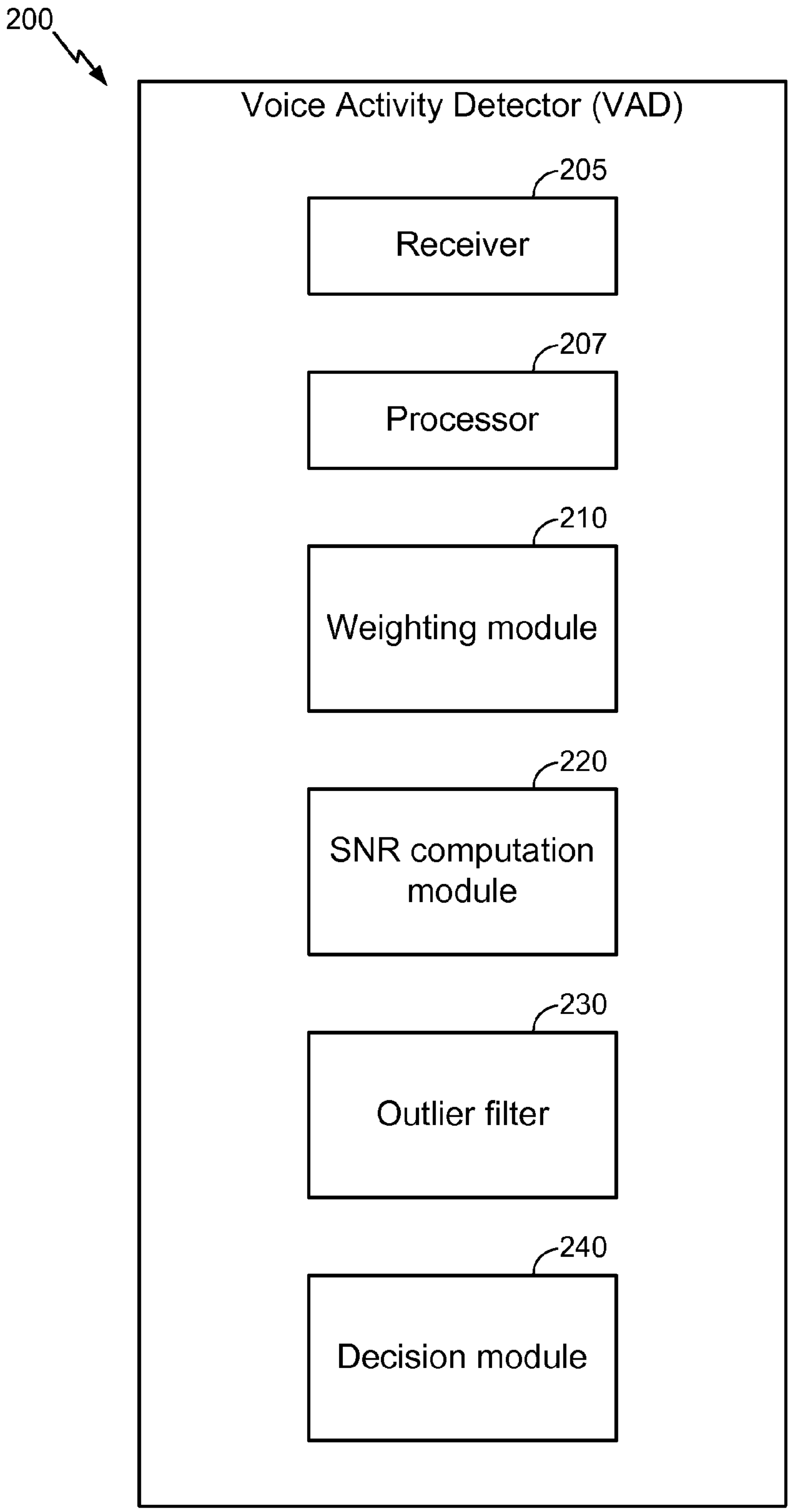
FIG. 2 is a block diagram illustrating an implementation of a voice activity detector.
Figure 3:
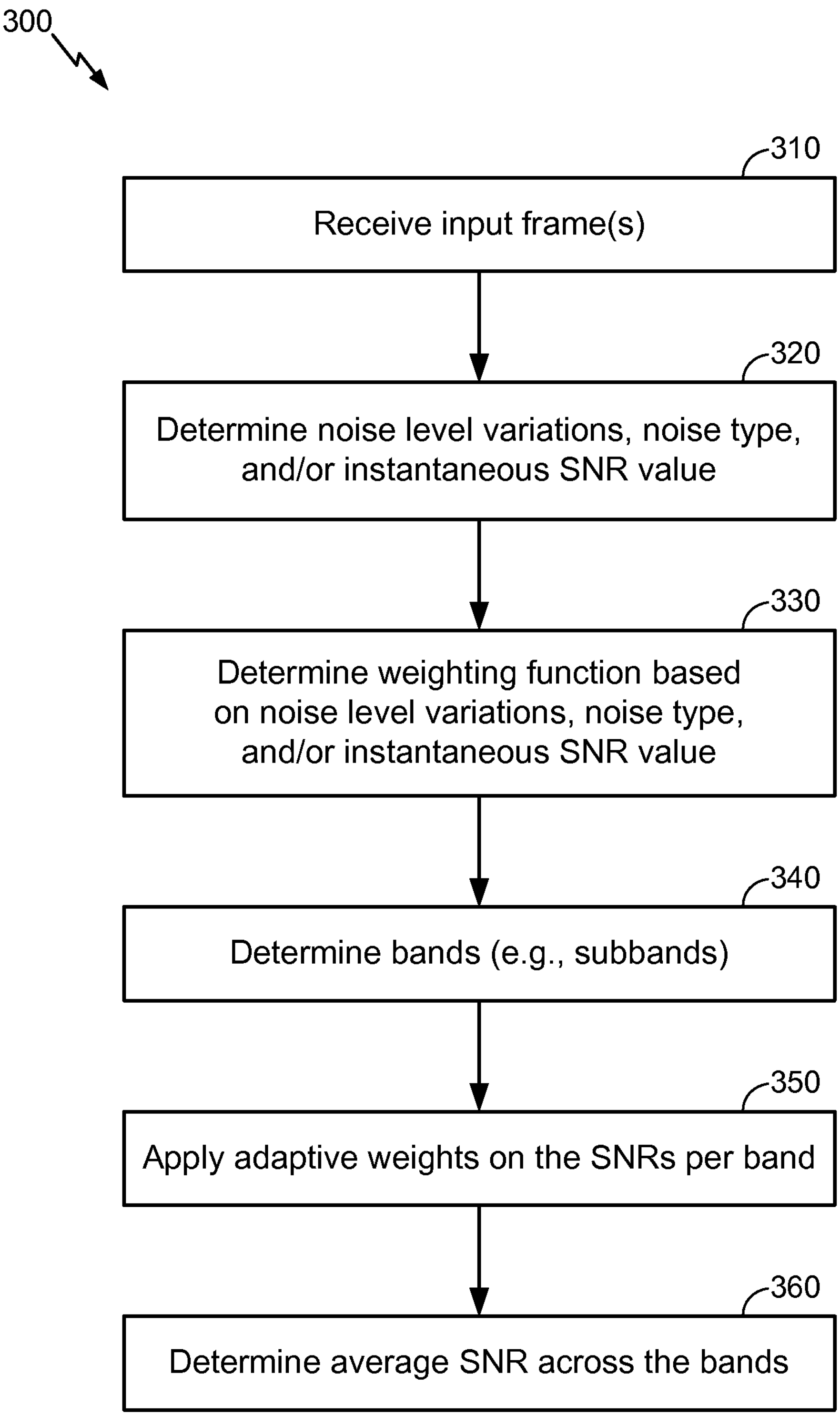
FIG. 3 is an operational flow of an implementation of a method of weighting an average SNR that may be used in detecting voice activity.

FIG. 2 is a block diagram illustrating an implementation of a voice activity detector (VAD) 200, and FIG. 3 is an operational flow of an implementation of a method 300 of weighting an average SNR.

In an implementation, the VAD 200 comprises a receiver 205, a processor 207, a weighting module 210, an SNR computation module 220, an outlier filter 230, and a decision module 240. The VAD 200 may be comprised within, or coupled to, a device that also includes one or more microphones which captures sound. Alternatively or additionally, the receiver 205 may comprise a device which captures sound. The continuous sound may be sent to a digitizer (e.g., a processor such as the processor 207) which samples the sound at discrete intervals and quantizes (e.g., digitizes) the sound. The device may divide the incoming sound signal into blocks of time, or analysis frames or portions. The duration of each segment in time (or frame) is typically selected to be short enough that the spectral envelope of the signal may be expected to remain relatively stationary. Depending on the implementation, the VAD 200 may be comprised within a mobile station or other computing device. An example mobile station is described with respect to FIG. 8. An example computing device is described with respect to FIG. 9.

In an implementation, the average SNR is weighted (e.g., by the weighting module 210). More particularly, adaptive weights are applied on the SNRs per band before computing $SNR_{avg}$. In an implementation, that is, as represented by equation (5):

$$SNR_{avg}=10\log 10(\Sigma_{m=1}^{M} WEIGHT(m)\, SNR_{CB}(m)) \quad (5)$$

The weighting function, WEIGHT(m), can be a function of noise level, noise type, and/or instantaneous SNR value. At 310, one or more input frames of sound may be received at the VAD 200. At 320, the noise level, the noise type, and/or the instantaneous SNR value may be determined, e.g., by a processor of the VAD 200. The instantaneous SNR value may be determined by the SNR computation module 220 for example.

At 330, the weighting function may be determined based on the noise level, the noise type, and/or the instantaneous SNR value, e.g., by a processor of the VAD 200. Bands (also referred to as subbands) may be determined at 340, and adaptive weights may be applied on the SNRs per band at 350, e.g., by a processor of the VAD 200. The average SNR across the bands may be determined at 360, e.g., by the SNR computation module 220.

For example, if the instantaneous SNR values in bands 1, 2, and 3 are significantly lower (e.g., 20 times) than the instantaneous SNR values in bands ≥4, then the $SNR_{CB}(m)$ for m<4 may receive lower weights than for the bands m≥4. This is typically the case in car noise where the SNRs at lower bands (<300 Hz) are significantly lower than the SNR in higher bands during voice active regions.

Noise type and background noise level variation may be detected for the purpose of selecting a WEIGHT(m) curve. In an implementation, a set of WEIGHT(m) curves are pre-calculated and stored in a database or other storage or memory device or structure, and each one is chosen per processing frame depending on the detected background noise type (e.g., stationary or non-stationary) and the background noise level variations (e.g., 3 dB, 6 dB, 9 dB, 12 dB increase in noise level).

As described herein, implementations compensate for the sudden changes in the background noise in the $SNR_{avg}$ calculation by selectively adjusting the SNR values in bands by outlier filtering and applying weights.

In an implementation, SNR outlier filtering may be used, either alone or in conjunction with weighting the average SNR. More particularly, another weighting mechanism may apply a null filtering or outlier filtering which essentially sets the WEIGHT in a particular band to be zero. This particular band may be characterized as the one that exhibits an SNR that is several times higher than the SNRs in other bands.

Figure 4:
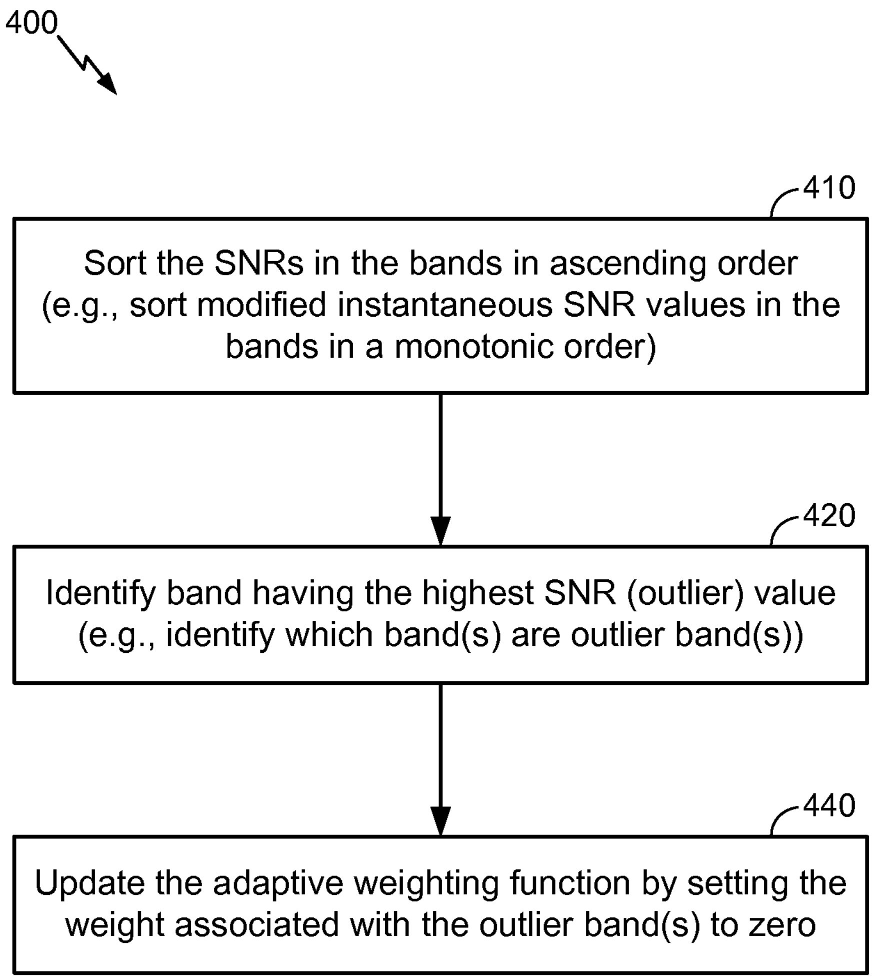
FIG. 4 is an operational flow of an implementation of a method of SNR outlier filtering that may be used in detecting voice activity.

FIG. 4 is an operational flow of an implementation of a method 400 of SNR outlier filtering. In this approach, the SNRs in the bands m=1, 2, . . . , 20 are sorted in ascending order at 410, and the band that has the highest SNR (outlier) value is identified at 420. The WEIGHT associated with that outlier band is set to zero at 430. Such a technique may be performed by the outlier filter 230, for example.

Figure 5:
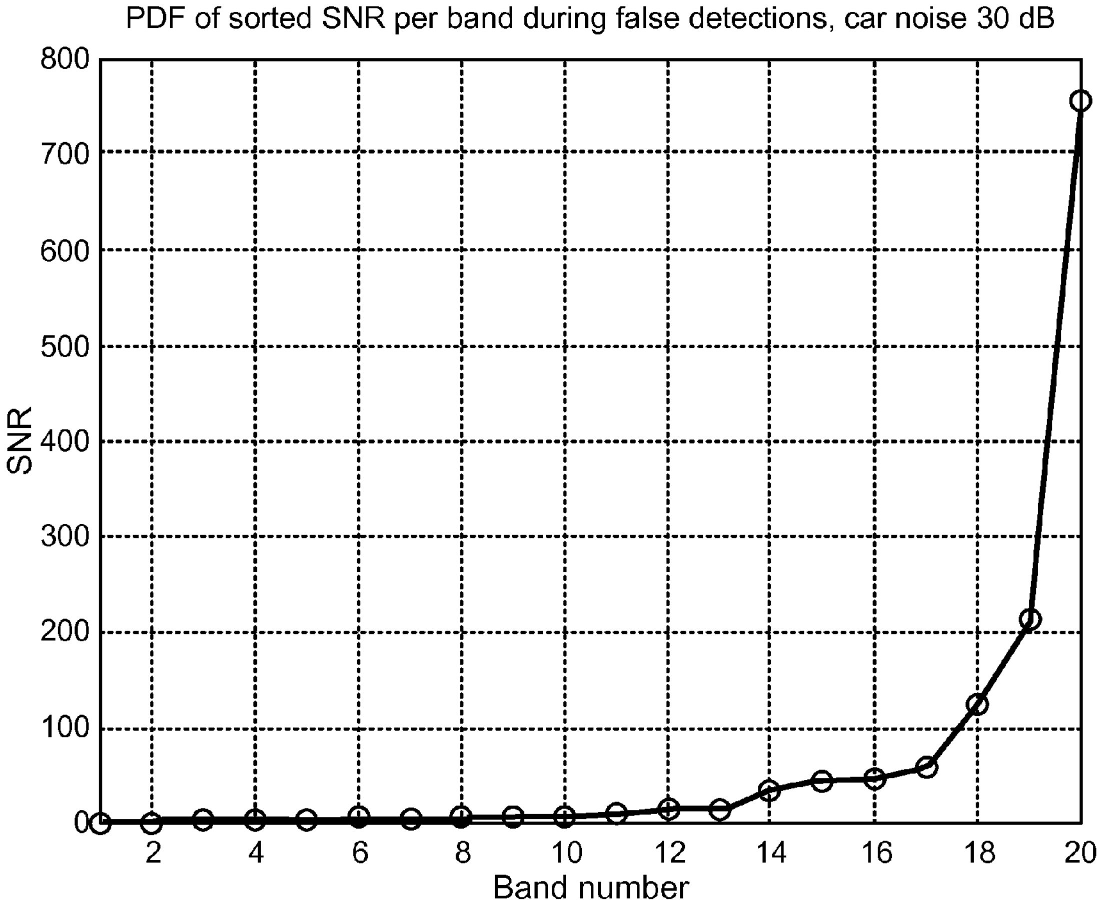
FIG. 5 is an example of a probability distribution function (PDF) of sorted SNR per band during false detections.

This SNR outlier issue may arise due to numerical precisions or underestimation of noise energy, for example, which produces spikes in the SNRs in certain bands. FIG. 5 is an example of a probability distribution function (PDF) of sorted SNR per band during false detections. FIG. 5 shows the PDF of sorted SNR over all the frames that are falsely classified as voice active. As shown in FIG. 5, the outlier SNR is several hundred times the median SNR in the 20 bands. Furthermore, the higher (outlier) SNR value in one band (in some cases due to underestimation of noise or numerical precision) is pushing the $SNR_{avg}$ higher than the VAD_THR and resulting in voice_activity=True.

Figure 6:
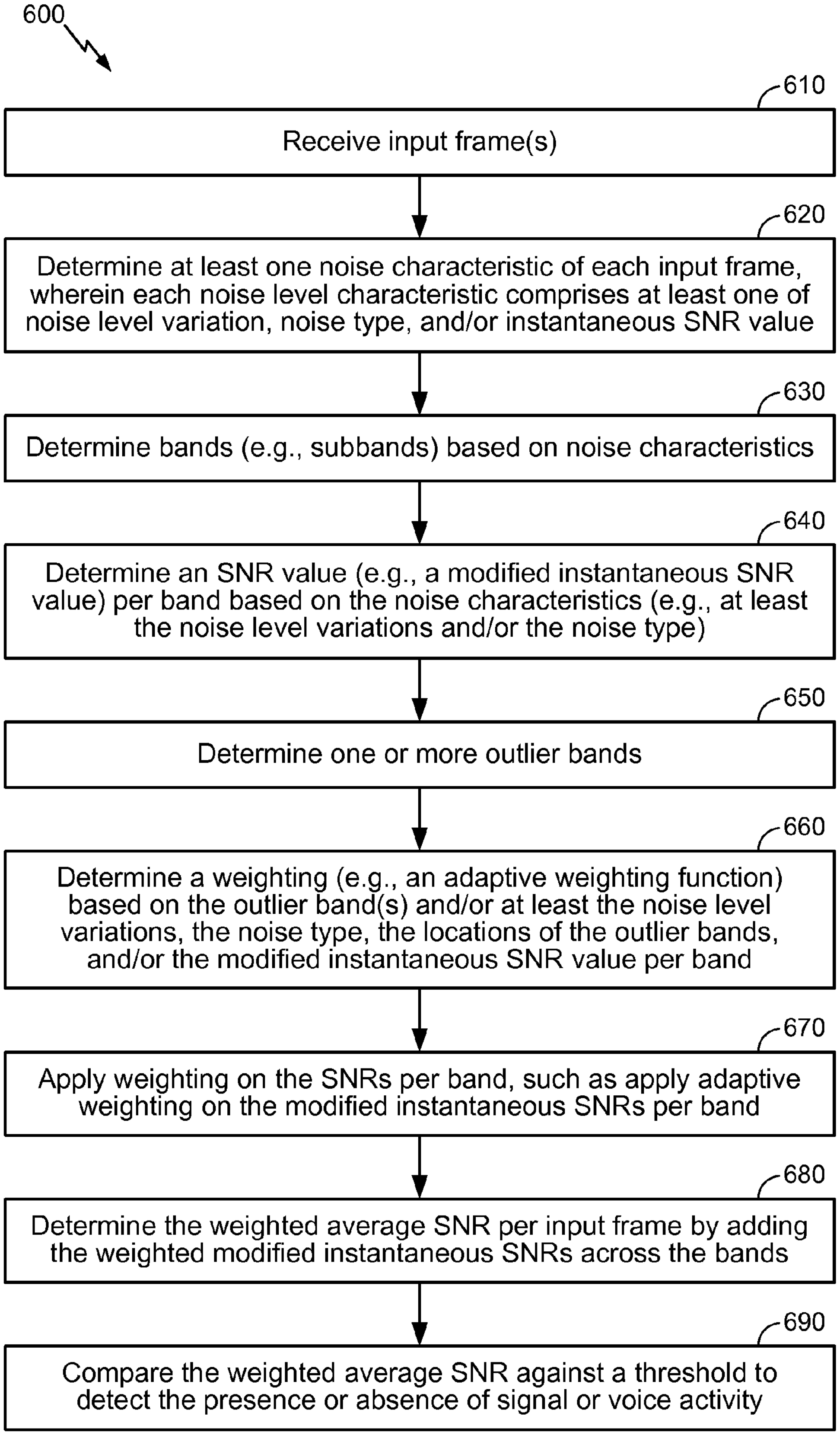
FIG. 6 is an operational flow of an implementation of a method for detecting voice activity in the presence of background noise.

FIG. 6 is an operational flow of an implementation of a method 600 for detecting voice activity in the presence of background noise. At 610, one or more input frames of sound are received, e.g., by a receiver of the VAD such as the receiver 205 of the VAD 200. At 620, noise characteristics of each input frame are determined. For example, noise characteristics such as the noise level variation, the noise type, and/or the instantaneous SNR value of the input frames are determined, e.g., by the processor 207 of the VAD 200.

At 630, using the processor 207 of the VAD 200 for example, bands are determined based on the noise characteristics, such as based on at least the noise level variations and/or the noise type. An SNR value per band is determined based on the noise characteristics, at 640. In an implementation, the modified instantaneous SNR value per band is determined by the SNR computation module 220 at 640 based on at least the noise level variations and/or the noise type. For example, the modified instantaneous SNR value per band may be determined based on: selectively smoothing the present estimates of the signal energies per band using the past estimates of the signal energies per band based on at least the instantaneous SNR of the input frame; selectively smoothing the present estimates of the noise energies per band using the past estimates of the noise energies per band based on at least the noise level variations and the noise type; and determining the ratios of smoothed estimates of signal energies and smoothed estimates of noise energies per band.

At 650, the outlier bands may be determined (e.g., by the outlier filter 230). In an implementation, the modified instantaneous SNR in any of the given band is several times greater than the sum of the modified instantaneous SNRs in the remainder of the bands.

In an implementation, at 660, an adaptive weighting function may be determined (e.g., by the weighting module 210) based on at least the noise level variations, the noise type, the locations of the outlier bands, and/or the modified instantaneous SNR value per band. The adaptive weighting may be applied on the modified instantaneous SNRs per band at 670, by the weighting module 210.

At 680, the weighted average SNR per input frame may be determined by the SNR computation module 220, by adding the weighted modified instantaneous SNRs across the bands. At 690, the weighted average SNR is compared against a threshold to detect the presence or absence of signal or voice activity. Such comparisons and determinations may be made by the decision module 240, for example.

In an implementation, performing SNR outlier filtering comprises sorting the modified instantaneous SNR values in the bands in a monotonic order, determining which of the band(s) are the outlier band(s), and updating the adaptive weighting function by setting the weight associated with the outlier band(s) to zero.

A well known approach is to make the VAD decision in subbands and then logically combine these subband VAD decisions to obtain a final VAD decision per frame. For example, Enhanced Variable Rate Codec-Wideband (EVRC-WB) uses three bands (low or "L": 0.2 to 2 kHz, medium or "M": 2 to 4 kHz and high or "H": 4 to 7 kHz) to make independent VAD decisions in the subbands. The VAD decisions are OR'ed to estimate the overall VAD decision for the frame. That is, as represented by equation (6):

If $SNR_{avg}(L)$>VAD_THR($L$) OR $SNR_{avg}(M)$ >VAD_THR($M$) OR $SNR_{avg}(H)$>VAD_THR($H$)

voice_activity=True;

else voice_activity=False. (6)

It has been experimentally observed that during a majority of missed speech detection cases (particularly at low SNR), the subband $SNR_{avg}$ values are slightly less than subband VAD_THR values, while in the past frames at least one of the subband $SNR_{avg}$ values is significantly larger than the corresponding subband VAD_THR.

In an implementation, an adaptive soft-VAD_THR approach in subbands may be used. Instead of logically combining the subband VAD decision, the differences between the VAD_THR and $SNR_{avg}$ in subbands are adaptively weighted.

Figure 7:
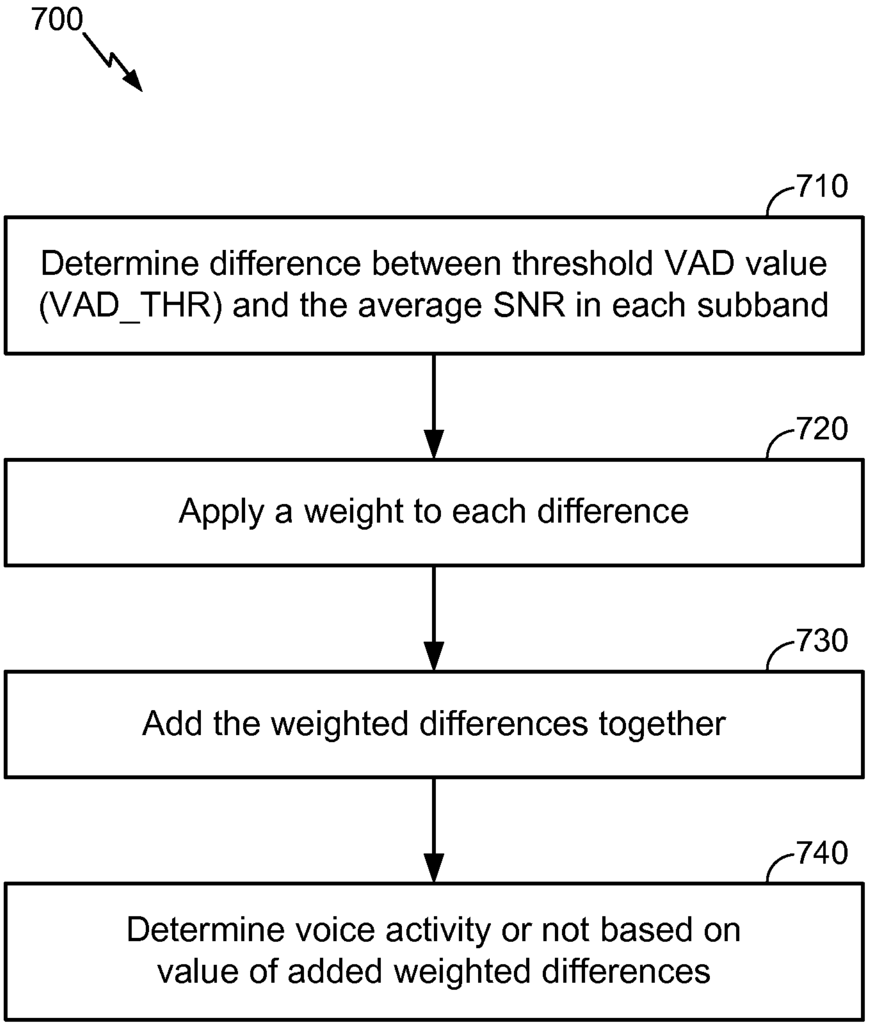
FIG. 7 is an operational flow of an implementation of a method that may be used in detecting voice activity.

FIG. 7 is an operational flow of an implementation of such a method 700. At 710, the difference between VAD_THR and $SNR_{avg}$ is determined in each subband, e.g., by a processor of the VAD 200. A weight is applied to each difference at 720, and the weighted differences are added together at 730, e.g., by the weighting module 210 of the VAD 200.

It may be determined at 740 (e.g., by the decision module 240) whether or not there is voice activity by comparing the result of 730 with another threshold, such as zero. That is, as shown in equations (7) and (8):

$$VTHR=\alpha_L(SNR_{avg}(L)-VAD\_THR(L))+\alpha_M(SNR_{avg}(M)-VAD\_THR(M))+\alpha_H(SNR_{avg}(H)-VAD\_THR(H)) \quad (7)$$

If VTHR>0 then voice_activity=True, else voice_activity=False. (8)

As an example, the weighting parameters $\alpha_L$, $\alpha_M$, $\alpha_H$ are first initialized to 0.3, 0.4, 0.3, respectively, e.g. by a user. The weighting parameters may be adaptively varied according to the long-term SNR in the subbands. The weighting parameters may be set to any value(s), e.g. by a user, depending on the particular implementation.

Note that when the weighting parameters $\alpha_L=\alpha_M=\alpha_H=1$, the above subband decision equation represented by equations (7) and (8) is similar to that of the fullband equation (3) described above.

Thus, in an implementation, EVRC-WB uses three bands (0.2 to 2 kHz, 2 to 4 kHz and 4 to 7 kHz) to make independent VAD decisions in the subbands. The VAD decisions are OR'ed to estimate the overall VAD decision for the frame.

In an implementation, there may be some overlap among the bands as follows (per octaves), for example: 0.2 to 1.7 kHz, 1.6 kHz to 3.6 kHz, and 3.7 kHz to 6.8 kHz. It has been determined that the overlap gives better results.

In an implementation, if a VAD criterion is satisfied in any of the two subbands, then it is treated as voice active frame.

Although the examples described above use three subbands with distinct frequency ranges, this is not meant to be limiting. Any number of subbands may be used, with any frequency ranges and any amount of overlap, depending on the implementation, or as desired.

The VAD described herein gives the ability to have a tradeoff between a subband VAD and fullband VAD and the advantages of improved false rate performance from EVRC-WB type of subband VAD and improved missed speech detection performance from AMR-WB type of fullband VAD.

The comparisons and thresholds described herein are not meant to be limiting, as any one or more comparisons and/or thresholds may be used depending on the implementation. Additional and/or alternative comparisons and thresholds may also be used, depending on the implementation.

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa).

As used herein, the term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The word "exemplary" is used throughout this disclosure to mean "serving as an example, instance, or illustration." Anything described herein as "exemplary" is not necessarily to be construed as preferred or advantageous over other approaches or features.

The term "signal processing" (and grammatical variants thereof) may refer to the processing and interpretation of signals. Signals of interest may include sound, images, and many others. Processing of such signals may include storage and reconstruction, separation of information from noise, compression, and feature extraction. The term "digital signal processing" may refer to the study of signals in a digital representation and the processing methods of these signals. Digital signal processing is an element of many communications technologies such as mobile stations, non-mobile stations, and the Internet. The algorithms that are utilized for digital signal processing may be performed using specialized computers, which may make use of specialized microprocessors called digital signal processors (sometimes abbreviated as DSPs).

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

Figure 8:
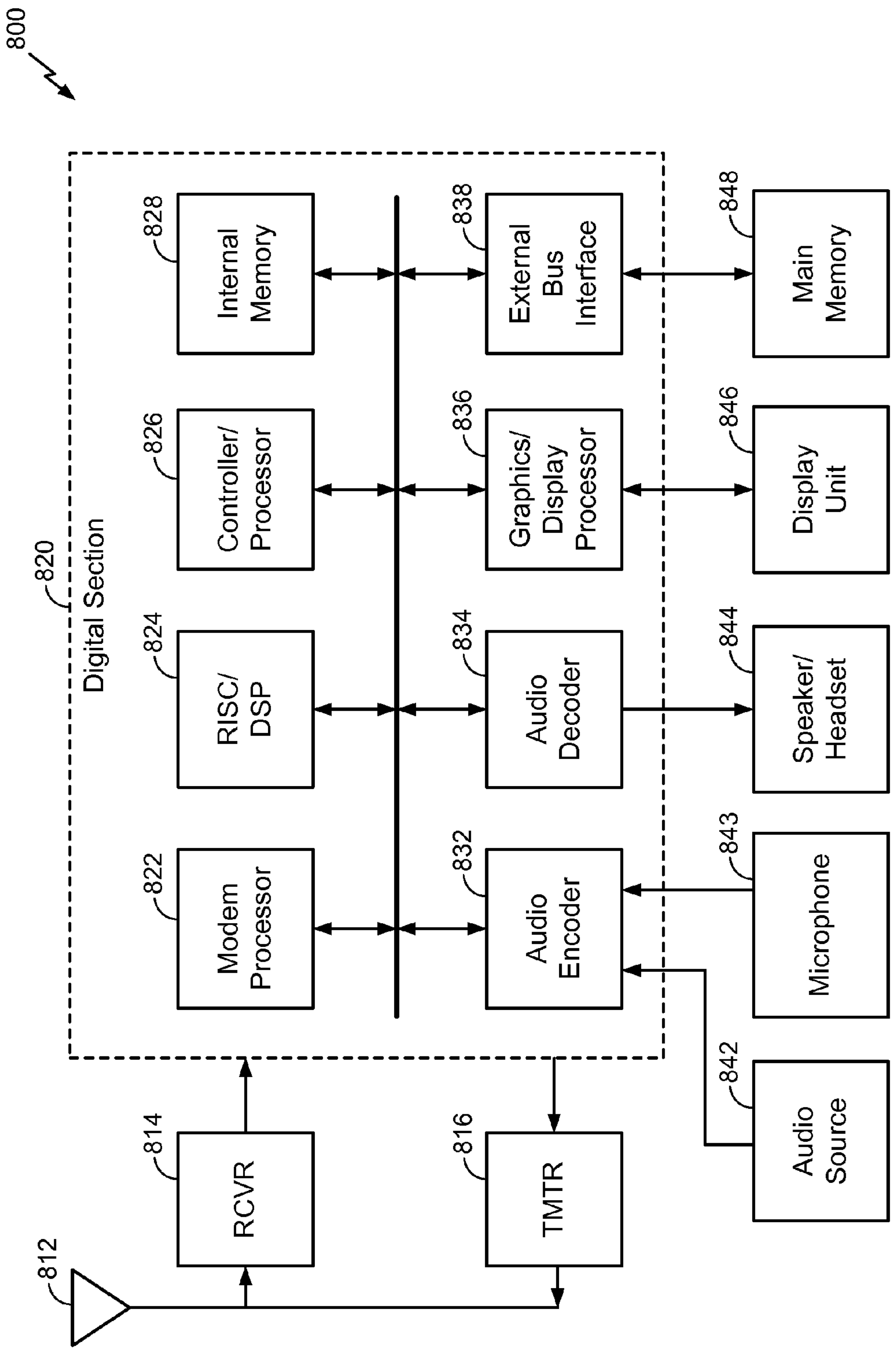
FIG. 8 is a diagram of an example mobile station.

FIG. 8 shows a block diagram of a design of an example mobile station 800 in a wireless communication system. Mobile station 800 may be a smart phone, a cellular phone, a terminal, a handset, a PDA, a wireless modem, a cordless phone, etc. The wireless communication system may be a CDMA system, a GSM system, etc.

Mobile station 800 is capable of providing bidirectional communication via a receive path and a transmit path. On the receive path, signals transmitted by base stations are received by an antenna 812 and provided to a receiver (RCVR) 814. Receiver 814 conditions and digitizes the received signal and provides samples to a digital section 820 for further processing. On the transmit path, a transmitter (TMTR) 816 receives data to be transmitted from digital section 820, processes and conditions the data, and generates a modulated signal, which is transmitted via antenna 812 to the base stations. Receiver 814 and transmitter 816 may be part of a transceiver that may support CDMA, GSM, etc.

Digital section 820 includes various processing, interface, and memory units such as, for example, a modem processor 822, a reduced instruction set computer/ digital signal processor (RISC/DSP) 824, a controller/processor 826, an internal memory 828, a generalized audio encoder 832, a generalized audio decoder 834, a graphics/display processor 836, and an external bus interface (EBI) 838. Modem processor 822 may perform processing for data transmission and reception, e.g., encoding, modulation, demodulation, and decoding. RISC/DSP 824 may perform general and specialized processing for wireless device 800. Controller/processor 826 may direct the operation of various processing and interface units within digital section 820. Internal memory 828 may store data and/or instructions for various units within digital section 820.

Generalized audio encoder 832 may perform encoding for input signals from an audio source 842, a microphone 843, etc. Generalized audio decoder 834 may perform decoding for coded audio data and may provide output signals to a speaker/headset 844. Graphics/display processor 836 may perform processing for graphics, videos, images, and texts, which may be presented to a display unit 846. EBI 838 may facilitate transfer of data between digital section 820 and a main memory 848.

Digital section 820 may be implemented with one or more processors, DSPs, microprocessors, RISCs, etc. Digital section 820 may also be fabricated on one or more application specific integrated circuits (ASICs) and/or some other type of integrated circuits (ICs).

Figure 9:
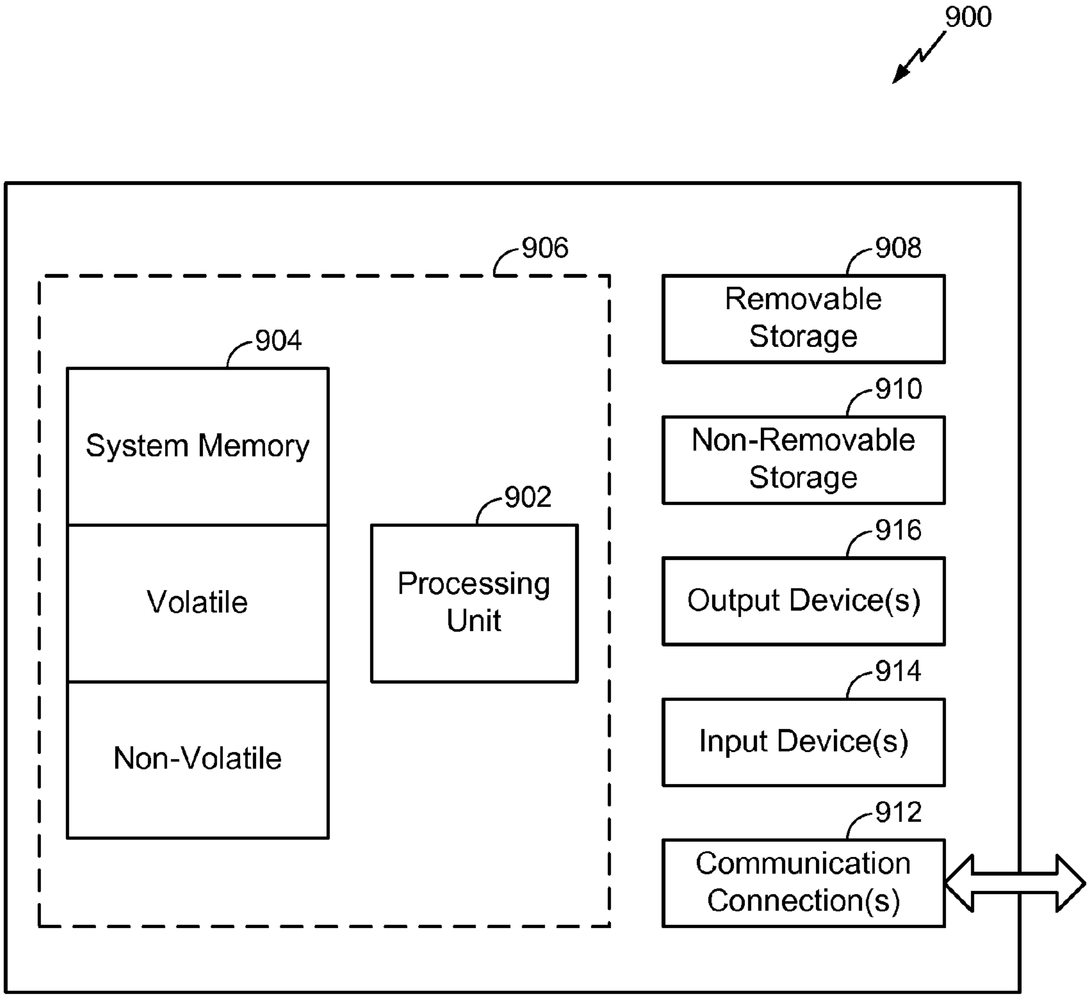
FIG. 9 shows an exemplary computing environment.

FIG. 9 shows an exemplary computing environment in which example implementations and aspects may be implemented. The computing system environment is only one example of a suitable computing environment and is not intended to suggest any limitation as to the scope of use or functionality.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 9, an exemplary system for implementing aspects described herein includes a computing device, such as computing device 900. In its most basic configuration, computing device 900 typically includes at least one processing unit 902 and memory 904. Depending on the exact configuration and type of computing device, memory 904 may be volatile (such as random access memory (RAM)), non-volatile (such as read-only memory (ROM), flash memory, etc.), or some combination of the two. This most basic configuration is illustrated in FIG. 9 by dashed line 906.

Computing device 900 may have additional features and/or functionality. For example, computing device 900 may include additional storage (removable and/or non-removable) including, but not limited to, magnetic or optical disks or tape. Such additional storage is illustrated in FIG. 9 by removable storage 808 and non-removable storage 910.

Computing device 900 typically includes a variety of computer-readable media. Computer-readable media can be any available media that can be accessed by device 900 and include both volatile and non-volatile media, and removable and non-removable media. Computer storage media include volatile and non-volatile, and removable and non-removable media implemented in any method or technology for storage of information such as computer readable instructions, data structures, program modules or other data. Memory 904, removable storage 908, and non-removable storage 910 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of computing device 900.

Computing device 900 may contain communication connection(s) 912 that allow the device to communicate with other devices. Computing device 900 may also have input device(s) 914 such as a keyboard, mouse, pen, voice input device, touch input device, etc. Output device(s) 916 such as a display, speakers, printer, etc. may also be included. All these devices are well known in the art and need not be discussed at length here.

In general, any device described herein may represent various types of devices, such as a wireless or wired phone, a cellular phone, a laptop computer, a wireless multimedia device, a wireless communication PC card, a PDA, an external or internal modem, a device that communicates through a wireless or wired channel, etc. A device may have various names, such as access terminal (AT), access unit, subscriber unit, mobile station, mobile device, mobile unit, mobile phone, mobile, remote station, remote terminal, remote unit, user device, user equipment, handheld device, non-mobile station, non-mobile device, endpoint, etc. Any device described herein may have a memory for storing instructions and data, as well as hardware, software, firmware, or combinations thereof.

The techniques described herein may be implemented by various means. For example, these techniques may be implemented in hardware, firmware, software, or a combination thereof. Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), FPGAs, processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For a firmware and/or software implementation, the techniques may be embodied as instructions on a computer-readable medium, such as random access RAM, ROM, non-volatile RAM, programmable ROM, EEPROM, flash memory, compact disc (CD), magnetic or optical data storage device, or the like. The instructions may be executable by one or more processors and may cause the processor(s) to perform certain aspects of the functionality described herein.

If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and blu-ray disc where disks usually reproduce data magnetically, while discs reproduce data optically with lasers. Combinations of the above should also be included within the scope of computer-readable media.

A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for detecting voice activity in the presence of background noise, comprising:

receiving one or more input frames of sound at a voice activity detector of a mobile station;

determining at least one noise characteristic of each of the input frames, wherein each noise characteristic comprises at least one of a noise level variation, a noise type, or an instantaneous SNR value;

determining a signal-to-noise ratio (SNR) value per band based on the noise characteristics;

determining at least one outlier band comprising a band with a highest SNR value;

determining a weighting based on the at least one outlier band;

applying the weighting and SNR outlier filtering on an average SNR; and detecting the presence or absence of voice activity using a weighted average SNR.

2. The method of claim 1, wherein each noise characteristic is an instantaneous SNR value.

3. The method of claim 2, wherein determining the SNR value per band comprises determining a modified instantaneous SNR value per band based on at least one of noise level variations or noise types.

4. The method of claim 3, wherein determining the modified instantaneous SNR value per band comprises:

selectively smoothing present estimates of signal energies per band using past estimates of signal energies per band based on at least the instantaneous SNR value of an input frame;

selectively smoothing present estimates of noise energies per band using past estimates of noise energies per band based on at least the noise level variations and the noise types; and determining ratios of smoothed estimates of signal energies and smoothed estimates of noise energies per band.

5. The method of claim 4, wherein the modified instantaneous SNR value in any one of a plurality of bands is greater than a sum of modified instantaneous SNR values in a remainder of the plurality of bands.

6. The method of claim 3, wherein determining the weighting based on the at least one outlier band comprises determining an adaptive weighting function based on at least one of the noise level variations, the noise types, at least one location of the at least one outlier band, or the modified instantaneous SNR value per band.

7. The method of claim 6, wherein applying the weighting and the SNR outlier filtering on the average SNR comprises applying the adaptive weighting function on modified instantaneous SNR values.

8. The method of claim 7, further comprising:

determining the weighted average SNR per input frame by adding weighted modified instantaneous SNR values across the plurality of bands; and comparing the weighted average SNR against a threshold to detect the presence or absence of signal or voice activity.

9. The method of claim 8, wherein comparing the weighted average SNR against a threshold to detect the presence or absence of signal or voice activity comprises:

determining a difference between the weighted average SNR and the threshold in each band of the plurality of bands;

applying a weight to each difference;

adding weighted differences together; and determining whether or not there is voice activity by comparing added weighted differences with another threshold.

10. The method of claim 9, wherein the threshold is zero, and further comprising determining there is voice activity if the added weighted differences are greater than zero and otherwise determining that there is no voice activity.

11. The method of claim 6, wherein applying the SNR outlier filtering on the average SNR comprises:

sorting modified instantaneous SNR values in the plurality of bands in a monotonic order;

determining which bands of the plurality of bands are outlier bands based on the modified instantaneous SNR values; and updating the adaptive weighting function by setting a weight associated with the outlier bands to zero.

12. The method of claim 1, further comprising determining a plurality of bands based on the noise characteristics.

13. An apparatus for detecting voice activity in the presence of background noise, comprising:

means for receiving one or more input frames of sound;

means for determining at least one noise characteristic of each of the input frames, wherein each noise characteristic comprises at least one of a noise level variation, a noise type, or an instantaneous SNR value;

means for determining a signal-to-noise ratio (SNR) value per band based on the noise characteristics;

means for determining at least one outlier band comprising a band with a highest SNR value;

means for determining a weighting based on the at least one outlier band; means for applying the weighting and SNR outlier filtering on an average SNR; and means for detecting the presence or absence of voice activity using a weighted average SNR.

14. The apparatus of claim 13, wherein each noise characteristic is an instantaneous SNR value.

15. The apparatus of claim 14, wherein the means for determining the SNR value per band comprises means for determining a modified instantaneous SNR value per band based on at least one of noise level variations or noise types.

16. The apparatus of claim 15, wherein the means for determining the modified instantaneous SNR value per band comprises:

means for selectively smoothing present estimates of signal energies per band using past estimates of signal energies per band based on at least the instantaneous SNR value of an input frame;

means for selectively smoothing present estimates of noise energies per band using past estimates of noise energies per band based on at least the noise level variations and the noise types; and means for determining ratios of smoothed estimates of signal energies and smoothed estimates of noise energies per band.

17. The apparatus of claim 16, wherein the modified instantaneous SNR value in any one of a plurality of bands is greater than a sum of modified instantaneous SNR values in a remainder of the plurality of bands.

18. The apparatus of claim 15, wherein the means for determining the weighting based on the at least one outlier band comprises means for determining an adaptive weighting function based on at least one of the noise level variations, the noise types, at least one location of the at least one outlier band, or the modified instantaneous SNR value per band.

19. The apparatus of claim 18, wherein the means for applying the weighting and the SNR outlier filtering on the average SNR comprises means for applying the adaptive weighting function on modified instantaneous SNR values.

20. The apparatus of claim 19, further comprising:

means for determining the weighted average SNR per input frame by adding weighted modified instantaneous SNR values across the plurality of bands; and means for comparing the weighted average SNR against a threshold to detect the presence or absence of signal or voice activity.

21. The apparatus of claim 20, wherein the means for comparing the weighted average SNR against a threshold to detect the presence or absence of signal or voice activity comprises:

means for determining a difference between the weighted average SNR and the threshold in each band of the plurality of bands;

means for applying a weight to each difference;

means for adding weighted differences together; and means for determining whether or not there is voice activity by comparing added weighted differences with another threshold.

22. The apparatus of claim 21, wherein the threshold is zero, and further comprising means for determining there is voice activity if the added weighted differences are greater than zero and otherwise determining that there is no voice activity.

23. The apparatus of claim 18, wherein the means for applying the SNR outlier filtering on the average SNR comprises:

means for sorting modified instantaneous SNR values in the plurality of bands in a monotonic order;

means for determining which bands of the plurality of bands are outlier bands based on the modified instantaneous SNR values; and means for updating the adaptive weighting function by setting a weight associated with the outlier bands to zero.

24. The apparatus of claim 13, further comprising means for determining a plurality of bands based on the noise characteristics.

25. A non-transitory computer-readable medium comprising instructions that cause a computer to:

receive one or more input frames of sound;
determine at least one noise characteristic of each of the input frames, wherein each noise characteristic comprises at least one of a noise level variation, a noise type, or an instantaneous SNR value;
determine a signal-to-noise ratio (SNR) value per band based on the noise characteristics;
determine at least one outlier band comprising a band with a highest SNR value;
determine a weighting based on the at least one outlier band; apply the weighting and SNR outlier filtering on an average SNR; and
detect the presence or absence of voice activity using a weighted average SNR.

26. The non-transitory computer-readable medium of claim 25, wherein each noise characteristic is an instantaneous SNR value.

27. The non-transitory computer-readable medium of claim 26, wherein the instructions that cause the computer to determine the SNR value per band comprise instructions that cause the computer to determine a modified instantaneous SNR value per band based on at least one of noise level variations or noise types.

28. The non-transitory computer-readable medium of claim 27, wherein the instructions that cause the computer to determine the modified instantaneous SNR value per band comprise instructions that cause the computer to:
selectively smooth present estimates of signal energies per band using past estimates of signal energies per band based on at least the instantaneous SNR value of an input frame;
selectively smooth present estimates of noise energies per band using past estimates of noise energies per band based on at least the noise level variations and the noise types; and
determine ratios of smoothed estimates of signal energies and smoothed estimates of noise energies per band.

29. The non-transitory computer-readable medium of claim 28, wherein the modified instantaneous SNR value in any one of a plurality of bands is greater than a sum of modified instantaneous SNR values in a remainder of the plurality of bands.

30. The non-transitory computer-readable medium of claim 27, wherein the instructions that cause the computer to determine the weighting based on the at least one outlier band comprise instructions that cause the computer to determine an adaptive weighting function based on at least one of the noise level variations, the noise types, at least one location of the at least one outlier band, or the modified instantaneous SNR value per band.

31. The non-transitory computer-readable medium of claim 30, wherein the instructions that cause the computer to apply the weighting and the SNR outlier filtering on the average SNR comprise instructions that cause the computer to apply the adaptive weighting function on modified instantaneous SNR values.

32. The non-transitory computer-readable medium of claim 31, further comprising computer-executable instructions that cause the computer to:
determine the weighted average SNR per input frame by adding weighted modified instantaneous SNR values across the plurality of bands; and
compare the weighted average SNR against a threshold to detect the presence or absence of signal or voice activity.

33. The non-transitory computer-readable medium of claim 32, wherein the instructions that cause the computer to compare the weighted average SNR against a threshold to detect the presence or absence of signal or voice activity comprise instructions that cause the computer to:
determine a difference between the weighted average SNR and the threshold in each band of the plurality of bands;
apply a weight to each difference;
add weighted differences together; and
determine whether or not there is voice activity by comparing added weighted differences with another threshold.

34. The non-transitory computer-readable medium of claim 33, wherein the threshold is zero, and the instructions are also executable to determine there is voice activity if the added weighted differences are greater than zero and otherwise determine that there is no voice activity.

35. The non-transitory computer-readable medium of claim 30, wherein the instructions that cause the computer to apply the SNR outlier filtering on the average SNR comprise instructions that cause the computer to:
sort the modified instantaneous SNR values in the plurality of bands in a monotonic order;
determine which bands of the plurality of bands are outlier bands based on the modified instantaneous SNR values; and
update the adaptive weighting function by setting a weight associated with the outlier bands to zero.

36. The non-transitory computer-readable medium of claim 25, further comprising instructions that cause the computer to determine a plurality of bands based on the noise characteristics.

37. A voice activity detector for detecting voice activity in the presence of background noise, comprising:
a receiver that receives one or more input frames of sound;
a processor that determines at least one noise characteristic of each of the input frames;
a signal-to-noise ratio (SNR) module that determines a SNR value per band based on the noise characteristics, wherein each noise characteristic comprises at least one of a noise level variation, a noise type, or an instantaneous SNR value;
an outlier filter that determines at least one outlier band comprising a band with a highest SNR value;
a weighting module that determines a weighting based on the at least one outlier band, and applies the weighting and SNR outlier filtering on an average SNR; and
a decision module that detects the presence or absence of voice activity using a weighted average SNR.

38. The voice activity detector of claim 37, wherein each noise characteristic is an instantaneous SNR value.

39. The voice activity detector of claim 38, wherein the SNR computation module determines a modified instantaneous SNR value per band based on at least one of noise level variations or noise types.

40. The voice activity detector of claim 39, wherein the SNR computation module:
selectively smoothes present estimates of signal energies per band using past estimates of signal energies per band based on at least the instantaneous SNR value of an input frame;
selectively smoothes present estimates of noise energies per band using past estimates of noise energies per band based on at least the noise level variations and the noise types; and
determines ratios of smoothed estimates of signal energies and smoothed estimates of noise energies per band.

41. The voice activity detector of claim 40, wherein the modified instantaneous SNR value in any one of a plurality of bands is greater than a sum of modified instantaneous SNR values in a remainder of the plurality of bands.

42. The voice activity detector of claim 39, wherein the weighting module determines an adaptive weighting function based on at least one of the noise level variations, the noise types, at least one location of the at least one outlier band, or the modified instantaneous SNR value per band.

43. The voice activity detector of claim 42, wherein the weighting module applies the adaptive weighting function on modified instantaneous SNR values.

44. The voice activity detector of claim 43, wherein the SNR computation module determines the weighted average SNR per input frame by adding weighted modified instantaneous SNR values across the plurality of bands, and the decision module compares the weighted average SNR against a threshold to detect the presence or absence of signal or voice activity.

45. The voice activity detector of claim 44, wherein the decision module determines a difference between the weighted average SNR and the threshold in each band of the plurality of bands, applies a weight to each difference, adds weighted differences together, and determines whether or not there is voice activity by comparing added weighted differences with another threshold.

46. The voice activity detector of claim 45, wherein the threshold is zero, and the decision module determines there is voice activity if the added weighted differences are greater than zero and otherwise determines that there is no voice activity.

47. The voice activity detector of claim 42, wherein the outlier filter sorts modified instantaneous SNR values in the plurality of bands in a monotonic order, determines which bands of the plurality of bands are outlier bands based on the modified instantaneous SNR values, and updates the adaptive weighting function by setting a weight associated with the outlier bands to zero.

48. The voice activity detector of claim 37, wherein the processor determines a plurality of bands based on the noise characteristics.

* * * * *